US012774804B1

(12) United States Patent
Lu

(10) Patent No.: US 12,774,804 B1
(45) Date of Patent: Oct. 27, 2026

(54) LUMINAIRE

(71) Applicant: Zhongshan Yusen Lighting Technology Co., Ltd., Zhongshan City (CN)

(72) Inventor: Jianquan Lu, Zhongshan City (CN)

(73) Assignee: Zhongshan Yusen Lighting Technology Co., Ltd., Zhongshan City (CN)

( * ) Notice: Subject to any disclaimer, the term of this patent is extended or adjusted under 35 U.S.C. 154(b) by 0 days.

(21) Appl. No.: 19/336,337

(22) Filed: Sep. 22, 2025

(30) Foreign Application Priority Data

Jul. 29, 2025 (CN) ......................... 202521604946.9

(51) Int. Cl.

| | |
|---|---|
| ***F21V 23/06*** | (2006.01) |
| ***F21S 6/00*** | (2006.01) |
| ***F21S 9/03*** | (2006.01) |
| ***F21V 21/08*** | (2006.01) |
| ***F21V 23/00*** | (2015.01) |
| ***F21V 23/02*** | (2006.01) |
| ***F21V 23/04*** | (2006.01) |
| ***H05B 47/11*** | (2020.01) |
| ***H05B 47/16*** | (2020.01) |
| ***H05B 47/17*** | (2020.01) |

(Continued)

(52) U.S. Cl.

CPC .............. *F21V 23/06* (2013.01); *F21S 6/005* (2013.01); *F21S 9/037* (2013.01); *F21V 21/0824* (2013.01); *F21V 23/005* (2013.01); *F21V 23/023* (2013.01); *F21V 23/0464* (2013.01); *H05B 47/11* (2020.01); *H05B 47/16* (2020.01); *H05B 47/17* (2020.01); *F21W 2131/109* (2013.01); *F21Y 2113/13* (2016.08)

(58) Field of Classification Search

CPC .... F21V 23/06; F21V 21/0824; F21V 23/005; F21V 23/023; F21V 23/0464; F21S 6/005; F21S 9/037; H05B 47/11; H05B 47/16; H05B 47/17; F21W 2131/109; F21Y 2113/13

See application file for complete search history.

(56) References Cited

U.S. PATENT DOCUMENTS 11,204,143 B1 * 12/2021 Hollinger .............. F21V 23/003
12,078,318 B1 * 9/2024 Hwang ................... F21S 9/037
12,152,755 B1 * 11/2024 Hwang ..................... F21S 9/03

(Continued)

*Primary Examiner* — Evan P Dzierzynski

(57) ABSTRACT

The present disclosure discloses a luminaire, including a translucent lamp shade having an accommodating cavity, a light-emitting lamp assembly disposed on the accommodating cavity, a connecting wire assembly connected to a lower side of the light-emitting lamp assembly, and further including a conductive plate and a battery assembly; the conductive plate is disposed at a lower side of the connecting wire assembly, and a middle part of a lower side thereof is provided with a positive conductive area and a preload connection area located outside the positive conductive area, and a negative conductive area concentrically arranged with the preload connection area; the battery assembly is rotatably connected to a lower side of the translucent lamp shade, and a positive terminal thereof is connected to the positive conductive area, and a negative terminal thereof is switchably connected between the preload connection area and the negative conductive area.

10 Claims, 12 Drawing Sheets

(51) Int. Cl.

| | |
|---|---|
| *F21W 131/109* | (2006.01) |
| *F21Y 113/13* | (2016.01) |

(56) References Cited

U.S. PATENT DOCUMENTS

| | | | | |
|---|---|---|---|---|
| 12,292,180 | B1 * | 5/2025 | Hwang | F21S 9/037 |
| 2012/0182725 | A1 * | 7/2012 | King | F21V 23/0442<br>362/183 |
| 2013/0163236 | A1 * | 6/2013 | Steele | F21V 21/0824<br>362/418 |

* cited by examiner

LUMINAIRE

CROSS REFERENCE TO RELATED APPLICATIONS

The present disclosure claims the priority of Chinese Patent Application No. 202521604946.9 filed on Jul. 29, 2025 before CNIPA. All the above are hereby incorporated by reference in their entirety.

TECHNICAL FIELD

The present disclosure relates to the technical field of luminaires, and in particular, to a luminaire.

BACKGROUND

In the field of modern lighting, the design and functionality of luminaires have become increasingly diverse to meet the requirements of different occasions and aesthetic preferences, such as solar ground lights, solar wall lights, solar floodlights, and solar lawn lights.

Currently, solar lawn lights available on the market typically consist of a translucent lamp shade, a solar light-emitting assembly, a battery pack, and a ground stake. However, most existing solar lawn lights emit only a single color, resulting in monotonous lighting effects that fail to satisfy diverse usage scenarios and individual user preferences. To address this, a small number of color-changing solar lawn lights have been introduced to the market. However, their color-switching functionality relies on adding a toggle switch button to the solar panel and creating an avoidance opening on the panel to accommodate the switch. This structural design not only significantly increases the manufacturing cost of the solar panel but also easily compromises its performance, affecting operational stability.

In view of this, the applicant has developed a solar lawn light that eliminates the need for a physical toggle switch button. The main structure includes a translucent lamp shade, a light-emitting assembly with a storage circuit and a control circuit, a battery pack, a conductive plate, and connecting wires. By rotating the battery pack clockwise or counterclockwise, the electrical connection between the battery pack and the conductive plate can be controlled, thereby achieving the color-switching functionality traditionally provided by a physical toggle switch button. This eliminates the technical issues associated with adding a switch button to the solar panel.

However, during the development process, the inventor encountered an issue where rotating the battery pack often resulted in multiple brief contacts between the battery pack and the conductive plate, leading to unstable color switching and negatively impacting the user experience. To resolve this problem, the inventor has developed a novel solar lawn light to meet practical usage requirements.

SUMMARY

A primary objective of the present disclosure is to provide a luminaire, aiming to solve the aforementioned technical issues.

A luminaire includes a translucent lamp shade having an accommodating cavity, a light-emitting lamp assembly disposed on the accommodating cavity, and a connecting wire assembly connected to a lower side of the light-emitting lamp assembly, wherein the luminaire further includes:

a conductive plate, disposed at a lower side of the connecting wire assembly, and a middle part of a lower side of the conductive plate is provided with a positive conductive area and a preload connection area located outside the positive conductive area, and a negative conductive area concentrically arranged with the preload connection area;

a battery assembly, rotatably connected to a lower side of the translucent lamp shade, and a positive terminal of the battery assembly is connected to the positive conductive area, and a negative terminal of the battery assembly is switchably connected between the preload connection area and the negative conductive area.

According to the aforementioned luminaire, a spacing area is provided between the preload connection area and the negative conductive area.

According to the aforementioned luminaire, the luminaire further includes:

a conductive plate connector, disposed at a lower side of the translucent lamp shade and extends upward into the accommodating cavity, wherein the conductive plate connector is provided with an accommodating cavity for accommodating the conductive plate, and is further provided with a communication cavity located above the accommodating cavity and communicating with the accommodating cavity;

a locking connector, threadedly connected to an outer side of an upper end of the conductive plate connector, wherein a lower surface thereof is attached to a bottom surface of the accommodating cavity, configured to lock and connect the conductive plate connector, and the locking connector is provided with an avoidance opening communicating with the communication cavity;

a lower end of the connecting wire assembly sequentially passes through the avoidance opening and the communication cavity and then is connected to the conductive plate.

According to the aforementioned luminaire, the connecting wire assembly includes a positive wire and a negative wire, the positive wire and the negative wire are both silver wires, or both silver-plated wires;

a left lower side wall of the communication cavity is provided with a left protrusion protruding rightward, and a right lower side wall thereof is provided with a right protrusion protruding leftward;

the left protrusion is provided with a left limiting opening for limiting a lower end of the positive wire;

the right protrusion is provided with a right limiting opening for limiting a lower end of the negative wire.

According to the aforementioned luminaire, an internal thread is provided inside the accommodating cavity;

the battery assembly includes:

a connection housing, wherein an outer side of an upper end thereof is provided with an external thread connectable with the internal thread, and the connection housing is further provided with a placement cavity;

a battery, disposed in the placement cavity, wherein an upper positive terminal thereof is connected to the positive conductive area;

a conductive spring, disposed in the placement cavity, wherein a lower end of the conductive spring is located at a lower side of the battery, and an upper end thereof extends upward and is hooked on a side wall of an upper end of the connection housing for connection with the preload connection area or with the negative conductive area.

According to the aforementioned luminaire, the light-emitting lamp assembly includes:

- a solar panel, disposed on an upper side of the accommodating cavity;
- an intermediate adjustment housing, disposed on a lower side of the solar panel, and provided with a through cavity penetrating vertically;
- a printed circuit board, disposed on a lower side inside the through cavity, and connected to the solar panel and the connecting wire assembly;
- a lamp bead, disposed on a lower side of the printed circuit board, configured to emit light when energized.

According to the aforementioned luminaire, a plurality of the lamp beads are provided, and the plurality of lamp beads emit light of different colors after being energized;

- the printed circuit board is provided with a control circuit, a light detection circuit, a storage circuit, a unidirectional conduction circuit, a battery management circuit, a delay circuit, and a clamping circuit;
- an input terminal of the control circuit is connected to an output terminal of the light detection circuit, a bidirectional data terminal of the control circuit is connected to a bidirectional data terminal of the storage circuit, an output terminal of the control circuit is connected to negative terminals of the plurality of lamp beads respectively, to control at least one of the plurality of lamp beads to emit light, a power input terminal of the control circuit is connected in parallel with the delay circuit, the power input terminal of the control circuit is connected in parallel with the clamping circuit, the power input terminal of the control circuit is connected to an output terminal of the unidirectional conduction circuit, an input terminal of the unidirectional conduction circuit is connected to an output terminal of the solar panel, the output terminal of the unidirectional conduction circuit is connected to an input terminal of the battery management circuit, an output terminal of the battery management circuit is electrically connected to the battery.

According to the aforementioned luminaire, the control circuit includes a control chip;

- the storage circuit includes a storage chip, and a bidirectional data terminal of the storage chip is connected to a bidirectional data terminal of the control chip;
- the light detection circuit includes a first resistor and a second resistor connected in series with each other, a common node of the first resistor and the second resistor is connected to an input terminal of the control chip, a first end of the first resistor is connected to a negative terminal of the solar panel, a second end of the second resistor is connected to a positive terminal of the solar panel;
- the delay circuit includes a first capacitor and a second capacitor, the first capacitor is connected in parallel with the power input terminal of the control chip, the second capacitor is connected in parallel with the power input terminal of the control chip;
- the clamping circuit includes a first diode, and both ends of the first diode are connected in parallel with the power input terminal of the control chip;
- the unidirectional conduction circuit includes a second diode, and a positive electrode of the second diode is connected to a positive terminal of the solar panel, a third resistor is connected in series between a negative electrode of the second diode and the power input terminal of the control chip, the negative electrode of the second diode is connected to a positive terminal of the battery;
- the battery management circuit includes a power chip, a fourth resistor, and a third capacitor, a first end of the fourth resistor is connected to the negative electrode of the second diode, the first end of the fourth resistor is connected to the positive terminal of the battery, a second end of the fourth resistor is connected to a first end of the third capacitor, a second end of the third capacitor is grounded, a common node of the fourth resistor and the third capacitor is electrically connected to the power chip.

Provided in the present disclosure is further a luminaire, including a translucent lamp shade having an accommodating cavity, and a solar panel disposed on an upper side of the accommodating cavity, where the luminaire further includes:

- an intermediate adjustment housing, disposed on a lower side of the solar panel, and provided with a through cavity penetrating vertically;
- a printed circuit board, disposed on a lower side inside the through cavity;
- a lamp bead, disposed on a lower side of the printed circuit board, configured to emit light when energized.

According to the aforementioned luminaire, the luminaire further includes:

- a conductive plate connector, disposed at a lower side of the translucent lamp shade and extends upward into the accommodating cavity;
- a locking connector, threadedly connected to an outer side of an upper end of the conductive plate connector, wherein a lower surface thereof is attached to a bottom surface of the accommodating cavity, configured to lock and connect the conductive plate connector;
- a conductive plate, disposed inside the conductive plate connector;
- a connecting wire assembly, wherein an upper end of the connecting wire assembly is connected to the printed circuit board, and a lower end thereof sequentially extends into the locking connector and the conductive plate connector and is then connected to the conductive plate;
- a battery assembly, connected to a lower side of the conductive plate connector, and is connected to the conductive plate.

Further, provided in the present disclosure is further a luminaire, including a translucent lamp shade having an accommodating cavity, a light-emitting lamp assembly on the accommodating cavity, and a connecting wire assembly connected to a lower side of the light-emitting lamp assembly, where the luminaire further includes:

- a conductive plate, disposed at a lower side of the connecting wire assembly, and a middle part of a lower side thereof is provided with a positive conductive area and a negative conductive area located outside the positive conductive area;
- a battery assembly, rotatably connected to a lower side of the translucent lamp shade, and a positive terminal thereof is connected to the positive conductive area, and a negative terminal thereof is switchably connected to the negative conductive area;
- the light-emitting lamp assembly includes a lamp bead and the printed circuit board, a plurality of the lamp beads are provided, and the plurality of lamp beads emit light of different colors after being energized;

the printed circuit board is provided with a control circuit, a light detection circuit, a storage circuit, and a delay circuit;

an input terminal of the control circuit is connected to an output terminal of the light detection circuit, a bidirectional data terminal of the control circuit is connected to a bidirectional data terminal of the storage circuit, an output terminal of the control circuit is connected to negative terminals of the plurality of lamp beads respectively, to control at least one of the plurality of lamp beads to emit light, a power input terminal of the control circuit is connected in parallel with the delay circuit.

Compared with the prior art, the above disclosure has the following advantages:

Through the coordination of the translucent lamp shade, the light-emitting lamp assembly, the connecting wire assembly, the conductive plate, and the battery assembly, as well as the arrangement of the positive conductive area, the preload connection area, and the negative conductive area on the conductive plate, the luminaire of the present disclosure enables that the positive terminal of the battery assembly is connected to the positive conductive area when the battery assembly is connected to the conductive plate, while the negative terminal of the battery assembly first contacts the preload connection area, and then the battery assembly is rotated so that the negative terminal of the battery assembly moves from the preload connection area to the negative conductive area and establishes tight contact with the negative conductive area, achieving a stable connection. This effectively avoids the issue of disordered color switching sequences caused by multiple brief contacts between the battery assembly and the conductive plate, ensuring the accuracy and stability of the luminaire's color switching functionality, while also enhancing the user experience.

DETAILED DESCRIPTION

Figure 1:
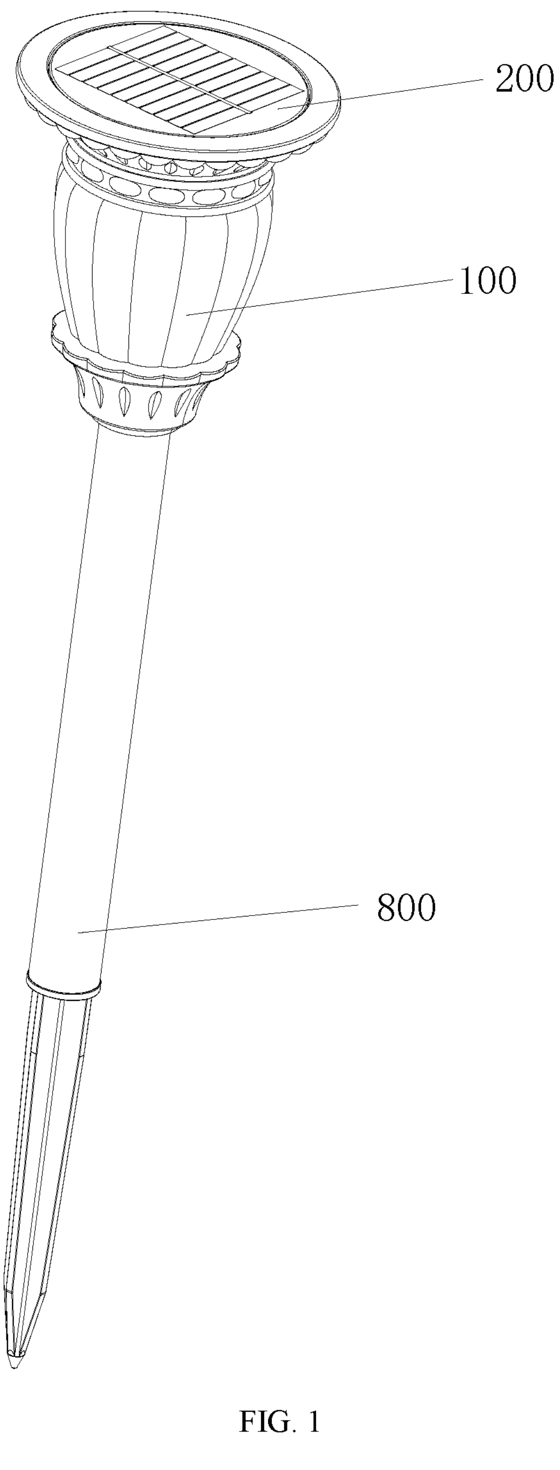
FIG. 1 is a perspective view of the luminaire of the present disclosure.

The technical solutions in the embodiments of the present disclosure are clearly and completely described and discussed below in conjunction with the attached drawings of the embodiments of the present disclosure. Obviously, the embodiments described herein are only some of the embodiments of the present disclosure but not all of them. Based on the Published in the present disclosure, all other embodiments obtained by those skilled in the art without creative efforts fall within the scope of protection of the present disclosure.

Embodiment 1

As shown in FIGS. 1 to 11, a luminaire includes a translucent lamp shade 100 having an accommodating cavity 101, a light-emitting lamp assembly 200 disposed on the accommodating cavity 101, a connecting wire assembly 300 connected to a lower side of the light-emitting lamp assembly 200, and further includes a conductive plate 400 and a locking connector 700.

The conductive plate 400 is disposed at a lower side of the connecting wire assembly 300, and a middle part of a lower side thereof is provided with a positive conductive area 401 and a preload connection area 402 located outside the positive conductive area 401, and a negative conductive area 403 concentrically arranged with the preload connection area 402;

The battery assembly 500 is rotatably connected to a lower side of the translucent lamp shade 100, and a positive terminal thereof is connected to the positive conductive area 401, and a negative terminal thereof is switchably connected between the preload connection area 402 and the negative conductive area 403.

Through the coordination of the translucent lamp shade 100, the light-emitting lamp assembly 200, the connecting wire assembly 300, the conductive plate 400, and the battery assembly 500, as well as the arrangement of the positive conductive area 401, the preload connection area 402, and the negative conductive area 403 on the conductive plate 400, the luminaire of the present disclosure enables that when the battery assembly 500 is connected to the conductive plate 400, the positive terminal of the battery assembly 500 is connected to the positive conductive area 401, while the negative terminal of the battery assembly 500 first contacts the preload connection area 402, and then the battery assembly 500 is rotated so that the negative terminal of the battery assembly 500 moves from the preload connection area 402 to the negative conductive area 403 and establishes tight contact with the negative conductive area 403, achieving a stable connection. This effectively avoids the issue of disordered color switching sequences caused by multiple brief contacts between the battery assembly 500 and the conductive plate 400, ensuring the accuracy and stability of the luminaire's color switching functionality, while also enhancing the user experience.

Furthermore, a spacing area 404 is provided between the preload connection area 402 and the negative conductive area 403. The purpose thereof is to effectively space apart the preload connection area 402 and the negative conductive area 403.

Moreover, the material of the translucent lamp shade 100 may be selected from high light transmittance acrylic or high light transmittance glass, preferably high light transmittance glass, to ensure uniform and bright light transmission when illuminated, enhancing light efficiency quality.

The luminaire further includes a conductive plate connector 600 and a locking connector 700.

The conductive plate connector 600 is disposed at a lower side of the translucent lamp shade 100 and extends upward into the accommodating cavity 101, and is provided with an accommodating cavity 601 for accommodating the conductive plate 400, and also provided with a communication cavity 602 located above the accommodating cavity 601 and communicating with the accommodating cavity 601;

The locking connector 700 is threadedly connected to an outer side of an upper end of the conductive plate connector 600, and a lower surface thereof is attached to a bottom surface of the accommodating cavity 101, for locking and connecting the conductive plate connector 600, and is provided with an avoidance opening 701 communicating with the communication cavity 602;

A lower end of the connecting wire assembly 300 sequentially passes through the avoidance opening 701 and the communication cavity 602 and then is connected to the conductive plate 400.

Through the ingenious design of the conductive plate connector 600 and the locking connector 700, the present disclosure ensures the stable installation of the conductive plate 400 and also reduces the molding difficulty of the translucent lamp shade 100, thereby facilitating production and assembly.

Furthermore, the luminaire further includes a ground stake 800 detachably connected to a lower side of the battery assembly 500, the purpose of which is to facilitate users inserting the luminaire of the present disclosure into the lawn.

Furthermore, the connecting wire assembly 300 includes a positive wire 301 and a negative wire 302, the positive wire 301 and the negative wire 302 are both silver wires, or both silver-plated wires; preferably silver wires, to ensure that the wires have excellent electrical conductivity and corrosion resistance, improve circuit stability, and extend the service life of the luminaire. At the same time, the high conductivity of silver wires helps reduce resistance, minimize energy loss, improve light efficiency utilization, and further enhance the overall performance of the luminaire.

A left lower side wall of the communication cavity 602 is provided with a left protrusion 6021 protruding rightward, and a right lower side wall thereof is provided with a right protrusion 6022 protruding leftward;

The left protrusion 6021 is provided with a left limiting opening 60211 for limiting a lower end of the positive wire 301, the purpose of which is to effectively limit the positive wire 301, prevent its displacement, and ensure stable circuit connection.

The right protrusion 6022 is provided with a right limiting opening 60221 for limiting a lower end of the negative wire 302, the purpose of which is to effectively limit the negative wire 302, prevent its displacement, and ensure stable circuit connection.

Furthermore, an internal thread 6011 is provided inside the accommodating cavity 601;

The battery assembly 500 includes a connection housing 51, a battery 52, and a conductive spring 53;

An outer side of an upper end of the connection housing 51 is provided with an external thread 511 connectable with the internal thread 6011, and a placement cavity 512 is further provided thereon;

The battery 52 is disposed in the placement cavity 512, and an upper positive terminal thereof is connected to the positive conductive area 401;

The conductive spring 53 is disposed in the placement cavity 512, and a lower end thereof is located at a lower side of the battery 52, and an upper end thereof extends upward and is hooked on a side wall of an upper end of the connection housing 51 for connection with the preload connection area 402 or with the negative conductive area 403.

When the battery assembly 500 is connected to the conductive plate connector 600, the conductive spring 53 is compressed by the battery 52, while the battery 52 is also subjected to the reactive force of the elastic force of the conductive spring 53, so that a certain preload force is set when the entire battery assembly 500 is initially connected to the conductive plate connector 600. This facilitates tight contact between the upper positive terminal of the battery 52 and the positive conductive area 401, and also facilitates tight contact between the upper end of the conductive spring 53 and the preload connection area 402 or the negative conductive area 403. This design ensures a stable connection between the battery assembly 500 and the conductive plate 400.

Furthermore, an outer part of the translucent lamp shade 100 is provided with a refraction portion 102 for refracting light to present a light spot pattern, the purpose of which is to enhance the visual effect of the entire luminaire and thereby improve its artistry and ornamental value.

Furthermore, the light-emitting lamp assembly 200 includes a solar panel 21, an intermediate adjustment housing 22, a printed circuit board 23, and a lamp bead 24; the solar panel 21 is disposed on an upper side of the accommodating cavity 101; the intermediate adjustment housing 22 is disposed on a lower side of the solar panel 21, and a through cavity 221 penetrating vertically is provided thereon; the printed circuit board 23 is disposed on a lower side inside the through cavity 221, and is connected to the solar panel 21 and the connecting wire assembly 300; the lamp bead 24 is disposed on a lower side of the printed circuit board 23, for emitting light when energized.

The present disclosure adopts the design of the intermediate adjustment housing 22 for the following reason:

During the design and development process, it was found that the height position of the lamp bead 24 inside the accommodating cavity 101 affects the lighting effect and significantly influences the light spot pattern refracted by the refraction portion 102.

Therefore, the present disclosure designs a replaceable intermediate adjustment housing 22 to flexibly adjust the position of the lamp bead 24, avoiding blurred or offset light spots, thereby ensuring the aesthetic and ornamental quality of the light spot pattern.

Furthermore, a left lower side of the through cavity 221 is provided with a left lower limiting notch 2211 for limiting an upper end of the positive wire 301, and a right lower side thereof is provided with a right lower limiting notch 2212 for limiting an upper end of the negative wire 302, the purpose of which is to ensure that the wires remain stable and do not shift.

Figure 2:
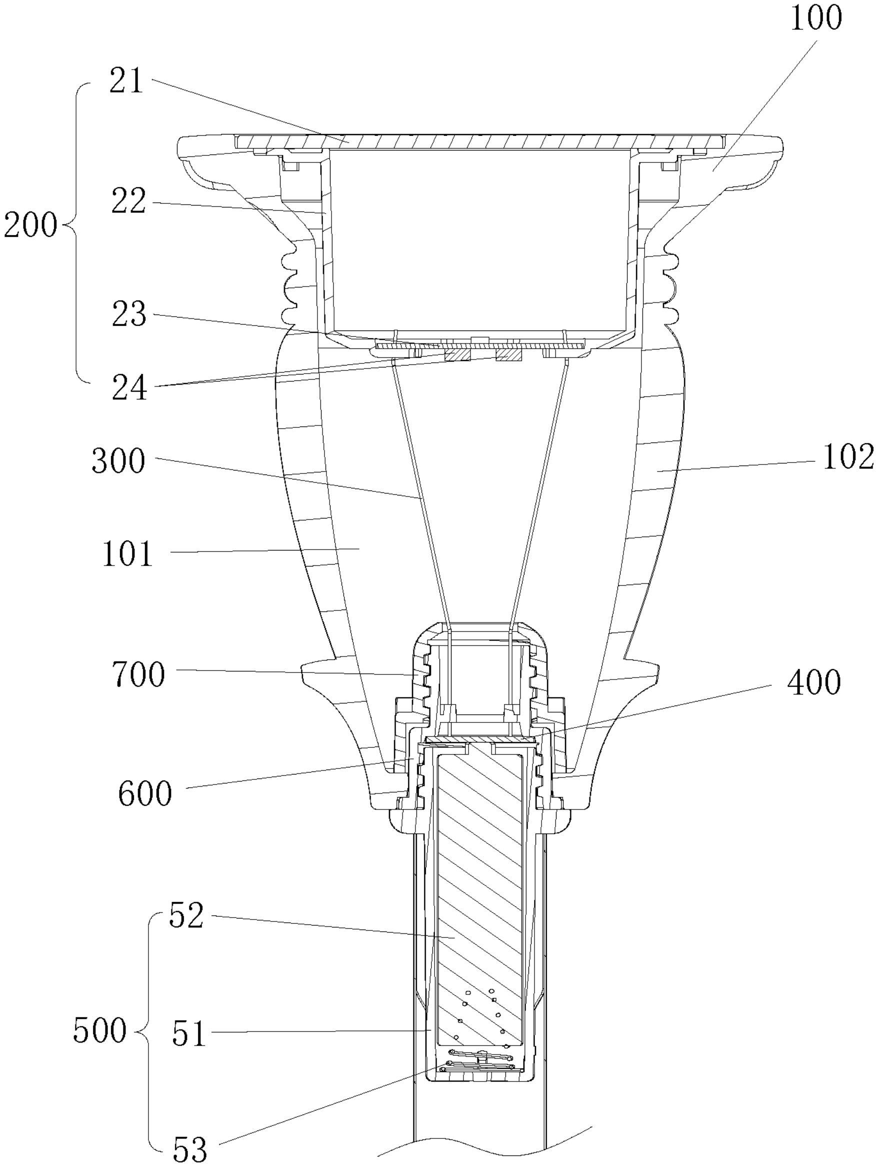
FIG. 2 is a partial cross-sectional view of the luminaire of the present disclosure.
Figure 3:
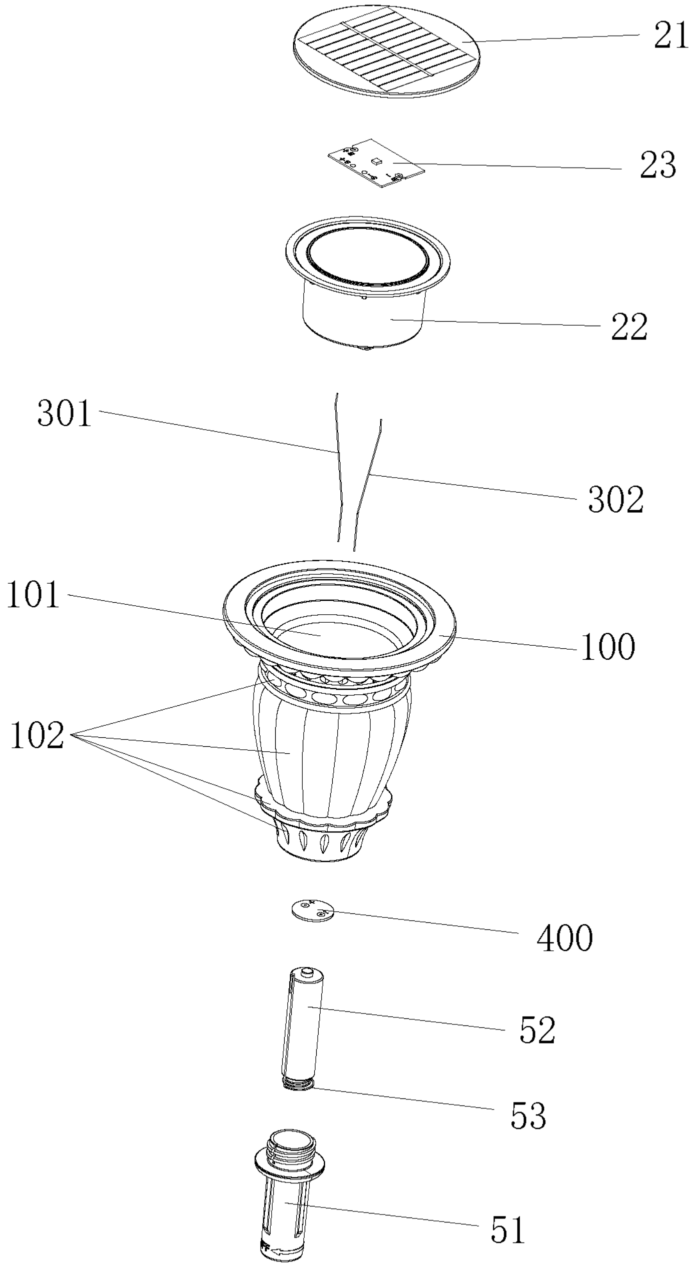
FIG. 3 is a partially exploded view of the luminaire of the present disclosure with the ground stake hidden.
Figure 4:
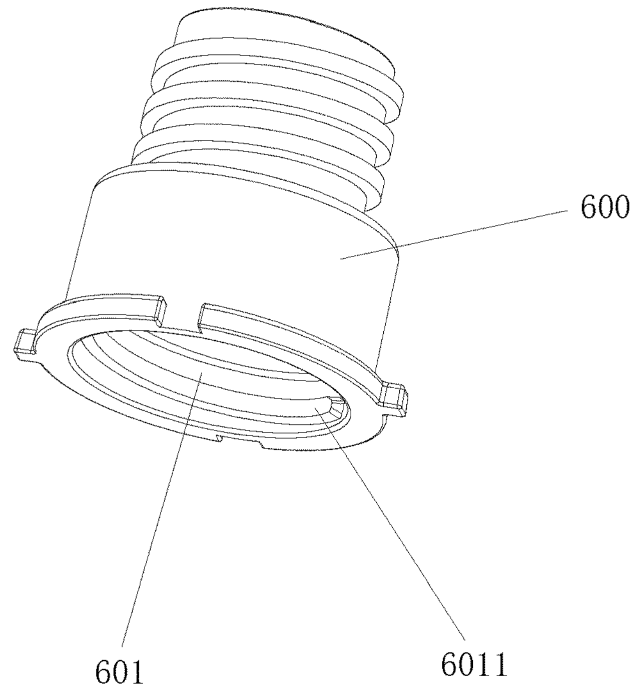
FIG. 4 is a perspective view of the conductive plate connector of the luminaire of the present disclosure.
Figure 5:
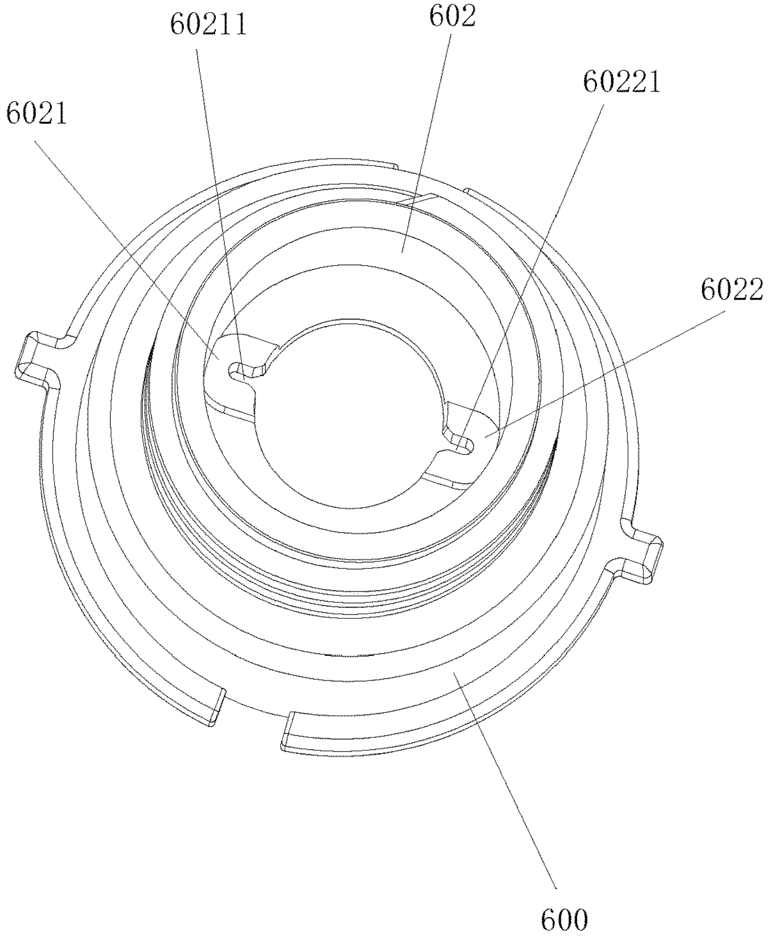
FIG. 5 is another perspective view of the conductive plate connector of the luminaire of the present disclosure.
Figure 6:
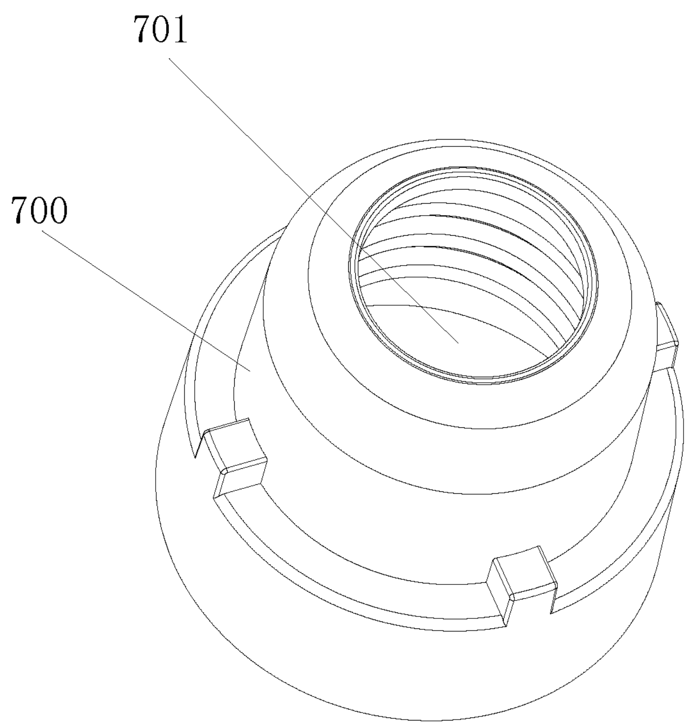
FIG. 6 is a perspective view of the locking connector of the luminaire of the present disclosure.
Figure 7:
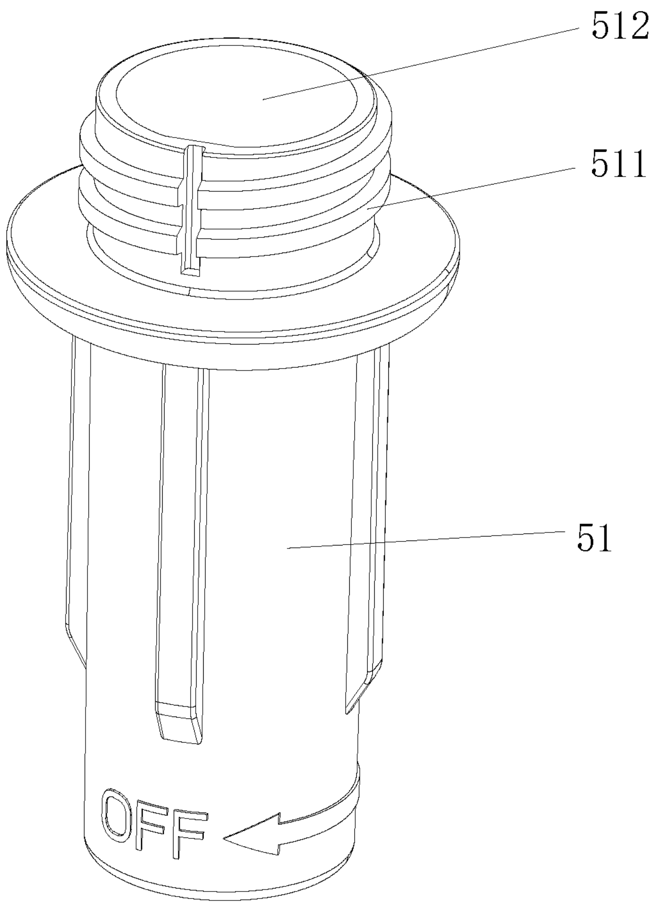
FIG. 7 is a perspective view of the connection housing of the luminaire of the present disclosure.
Figure 8:
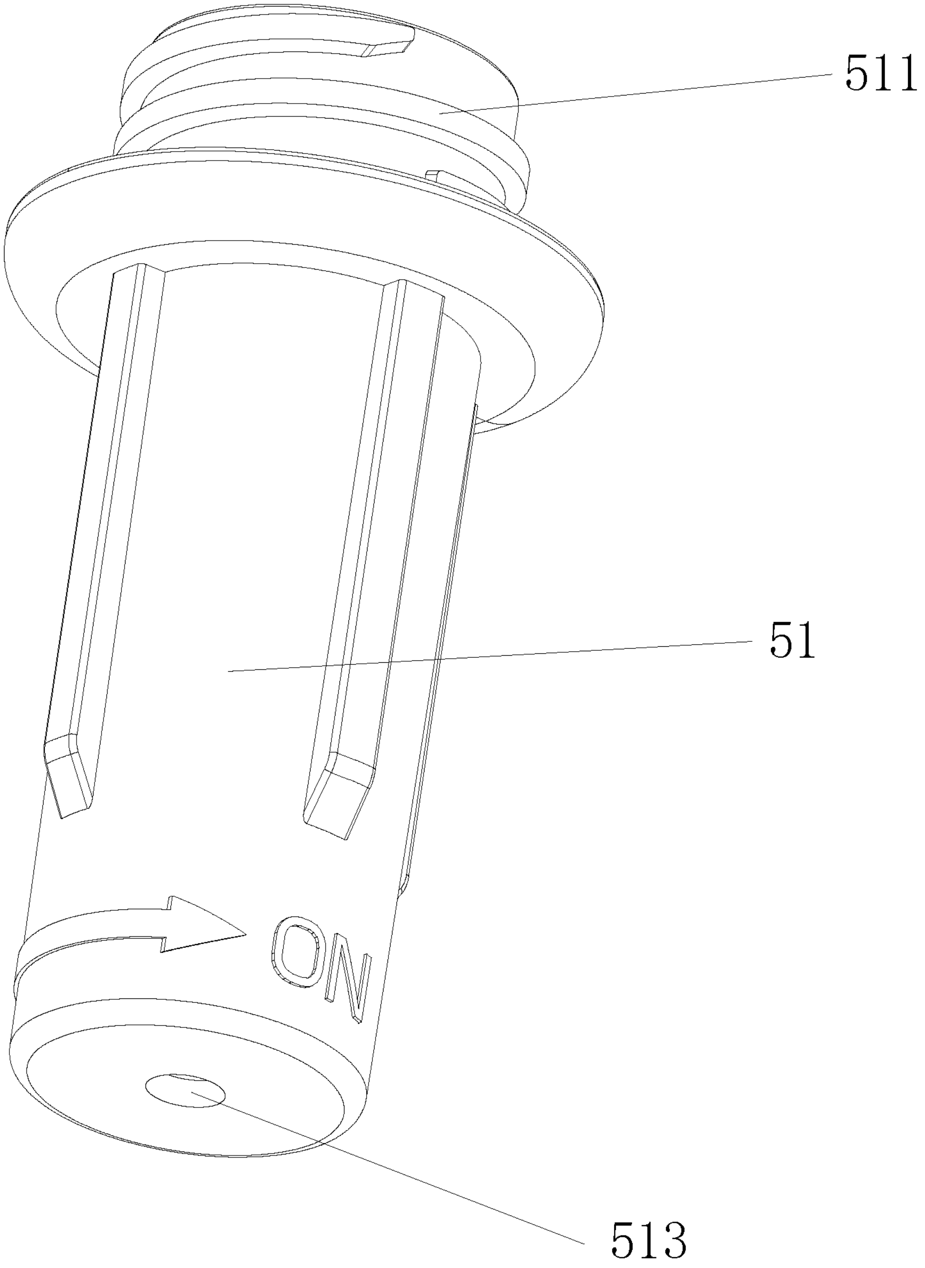
FIG. 8 is another perspective view of the connection housing of the luminaire of the present disclosure.
Figure 9:
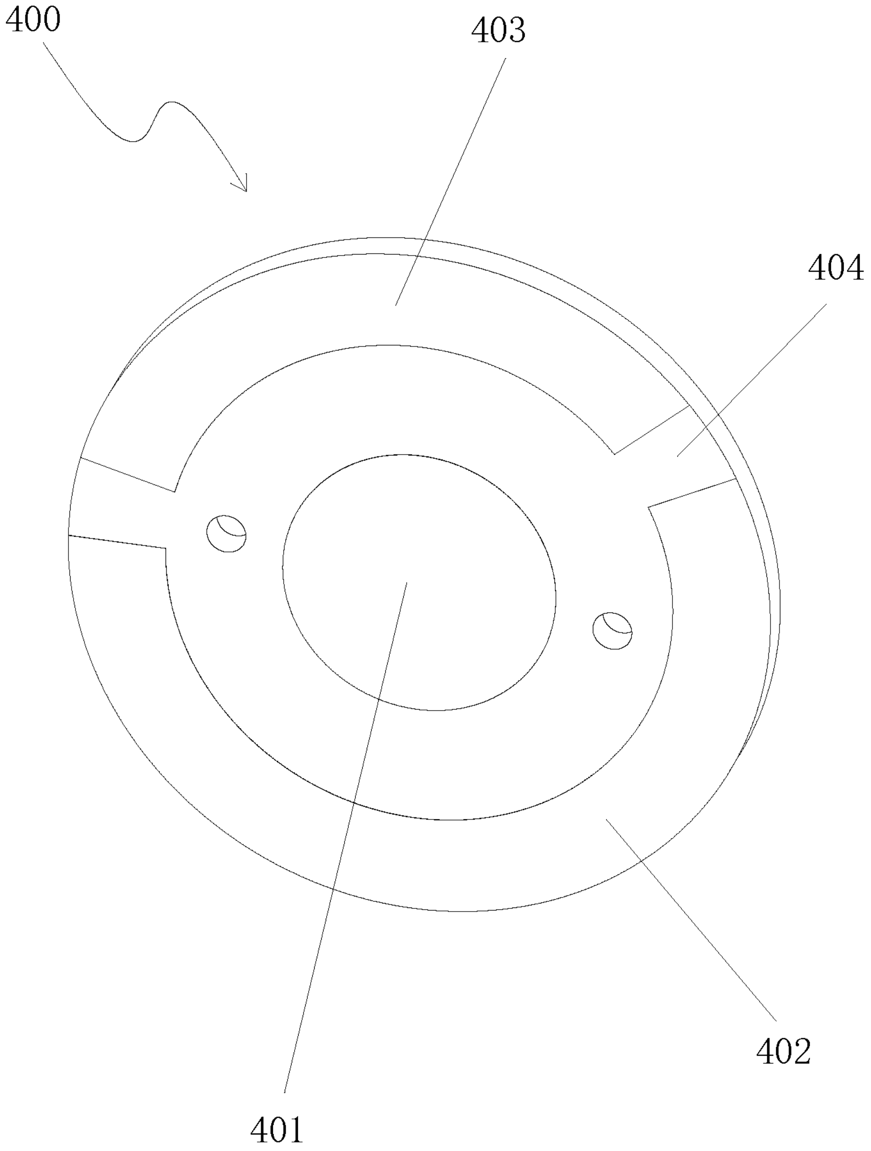
FIG. 9 is a perspective view of Embodiment 1 of the conductive plate of the luminaire of the present disclosure.
Figure 10:
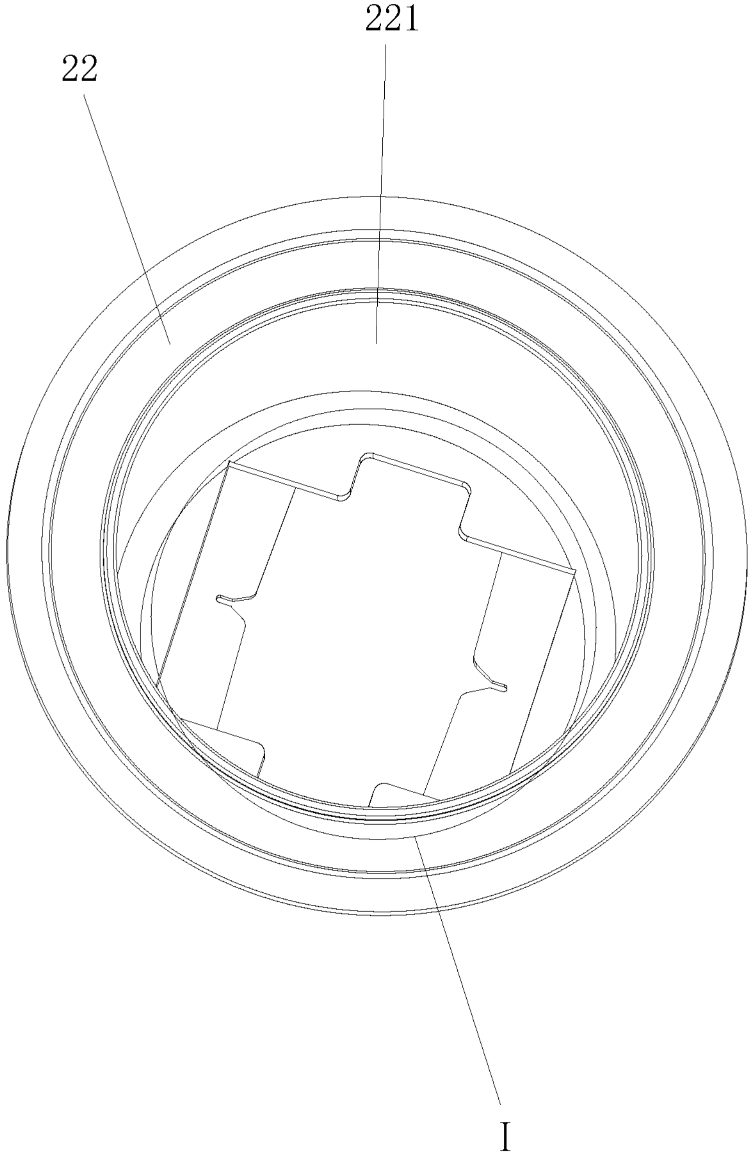
FIG. 10 is a perspective view of the intermediate adjustment housing of the luminaire of the present disclosure.
Figure 11:
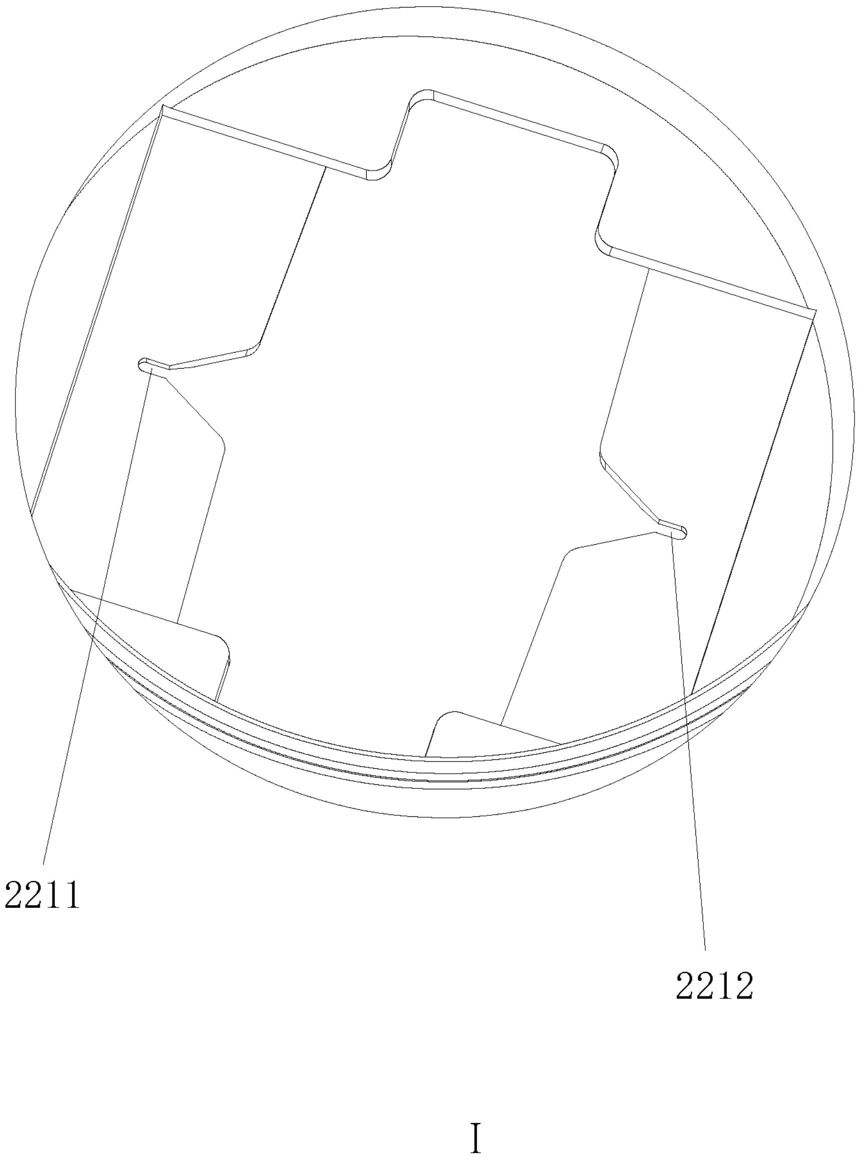
FIG. 11 is a partial enlarged view I of FIG. 10.
Figure 12:
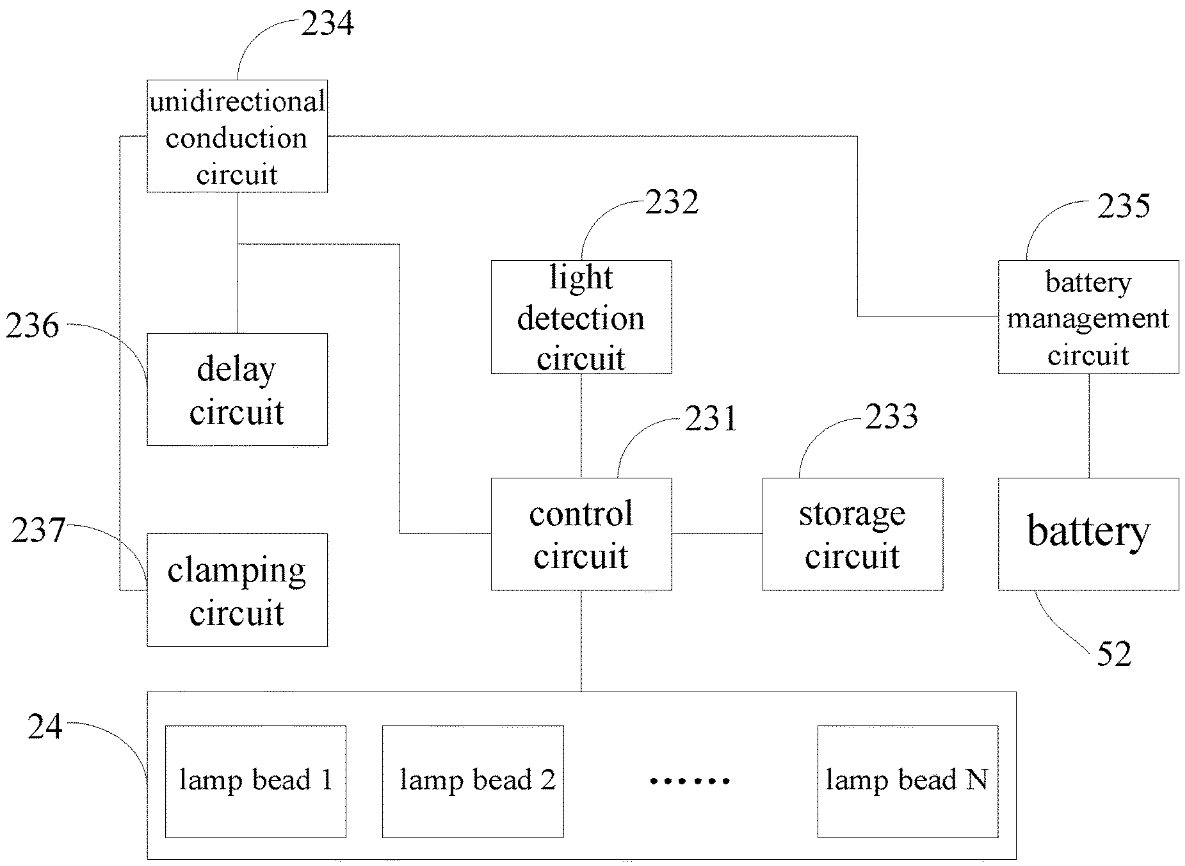
FIG. 12 is a schematic diagram of the circuit structure of the luminaire of the present disclosure.

Furthermore, referring to FIGS. 2 and 12, a plurality of the lamp beads 24 are provided, and the plurality of lamp beads 24 emit light of different colors after being energized;

The printed circuit board 23 is provided with a control circuit 231, a light detection circuit 232, a storage circuit 233, a unidirectional conduction circuit 234, a battery management circuit 235, a delay circuit 236, and a clamping circuit 237;

An input terminal of the control circuit 231 is connected to an output terminal of the light detection circuit 232, a bidirectional data terminal of the control circuit 231 is connected to a bidirectional data terminal of the storage circuit 233, an output terminal of the control circuit 231 is connected to negative terminals of the plurality of lamp beads 24 respectively, to control at least one of the plurality of lamp beads 24 to emit light, a power input terminal of the control circuit 231 is connected in parallel with the delay circuit 236, the power input terminal of the control circuit 231 is connected in parallel with the clamping circuit 237, the power input terminal of the control circuit 231 is connected to an output terminal of the unidirectional conduction circuit 234, an input terminal of the unidirectional conduction circuit 234 is connected to an output terminal of the solar panel 21, the output terminal of the unidirectional conduction circuit 234 is connected to an input terminal of the battery management circuit 235, and an output terminal of the battery management circuit 235 is electrically connected to the battery 52.

The control circuit 231 may be implemented using a microprocessor, microcontroller, or programmable logic device and so on, to control the lighting states of the plurality of lamp beads 24 through preset programs, achieving light effects of different colors. The light detection circuit 232 is configured to detect the ambient light intensity and transmit the detected light intensity signal to the control circuit 231. In the present embodiment, the detection of whether light is present may be determined based on whether the solar panel 21 is generating electricity. The storage circuit 233 is configured to store operational parameters of the luminaire, light effect settings, and other information, so that the control circuit 231 may read them when needed. The unidirectional conduction circuit 234 serves a rectification function, ensuring that the direct current output by the solar panel 21 may be correctly connected to the circuit. The battery management circuit 235 is configured to manage the charging and discharging processes of the battery 52, protecting the battery 52 from damage such as overcharging or over-discharging. The delay circuit 236 is configured to maintain the current light color when the power interruption time is less than 0.5 seconds. When there is sufficient light, the electrical energy generated by the solar panel 21 charges the battery 52 through the unidirectional conduction circuit 234 and the battery management circuit 235, while excess electrical energy is also stored in the delay circuit 236. When there is insufficient light or illumination is required, the control circuit 231 draws electrical energy from the battery 52 to control the emission of light from the plurality of lamp beads 24. The clamping circuit 237 is configured to limit the voltage or current in the circuit, protecting other components in the circuit from damage.

The control circuit 231 may automatically adjust the brightness and color of the light emitted by the plurality of lamp beads 24 based on ambient light intensity or preset time conditions to provide suitable lighting effects. For example, during the day or in well-lit environments, the control circuit 231 may control the lamp beads 24 to emit light at a lower brightness or even turn off some or all of the lamp beads 24 to save energy. In contrast, at night or in dimly lit environments, the control circuit 231 may control the lamp beads 24 to emit light at a higher brightness and adjust the light color as needed to create different atmospheres. Additionally, users may send commands to the control circuit 231 through an external operation interface (such as a remote control or smartphone application) to manually adjust the lighting effects, meeting personalized lighting needs.

The storage circuit 233 may store usage history, fault records, and other information of the luminaire to facilitate troubleshooting and maintenance.

The battery management circuit 235 may monitor the power status of the battery 52 or manage and optimize the electrical energy output by the solar panel 21 through the unidirectional conduction circuit 234, ensuring the lifespan and performance of the battery 52. For example, the battery management circuit 235 may control the battery 52 to discharge at a lower rate to extend its usage time when the battery 52 has sufficient charge. Additionally, the battery management circuit 235 may automatically turn off the luminaire or reduce the brightness of the light when the battery 52 power is too low, to avoid damage caused by over-discharging of the battery 52. This intelligent battery management strategy not only improves the energy efficiency of the luminaire but also provides users with a more reliable and long-lasting lighting experience.

Based on the control circuit 231, light detection circuit 232, storage circuit 233, unidirectional conduction circuit 234, battery management circuit 235, delay circuit 236, and clamping circuit 237 of this embodiment, stable and reliable switching of light color modes can be achieved. The switching process is as follows:

- The power is cut off and the light turns off when the connection housing 51 containing the battery 52 is rotated counterclockwise to loosen it, and the rotation angle is ≥90 degrees;
- The luminaire will cyclically switch to the next light color when the power-off time is ≥0.5 seconds, and the connection housing 51 is rotated clockwise again until tightened;
- The current light color may be maintained by combining the program design in the control circuit 231 when the power-off time is <0.5 seconds, the memory function of the storage circuit 233, and the delay circuit 236 implemented using capacitors, ensuring that the circuit retains the current light color even if the power interruption is less than 0.5 seconds.

Figure 13:
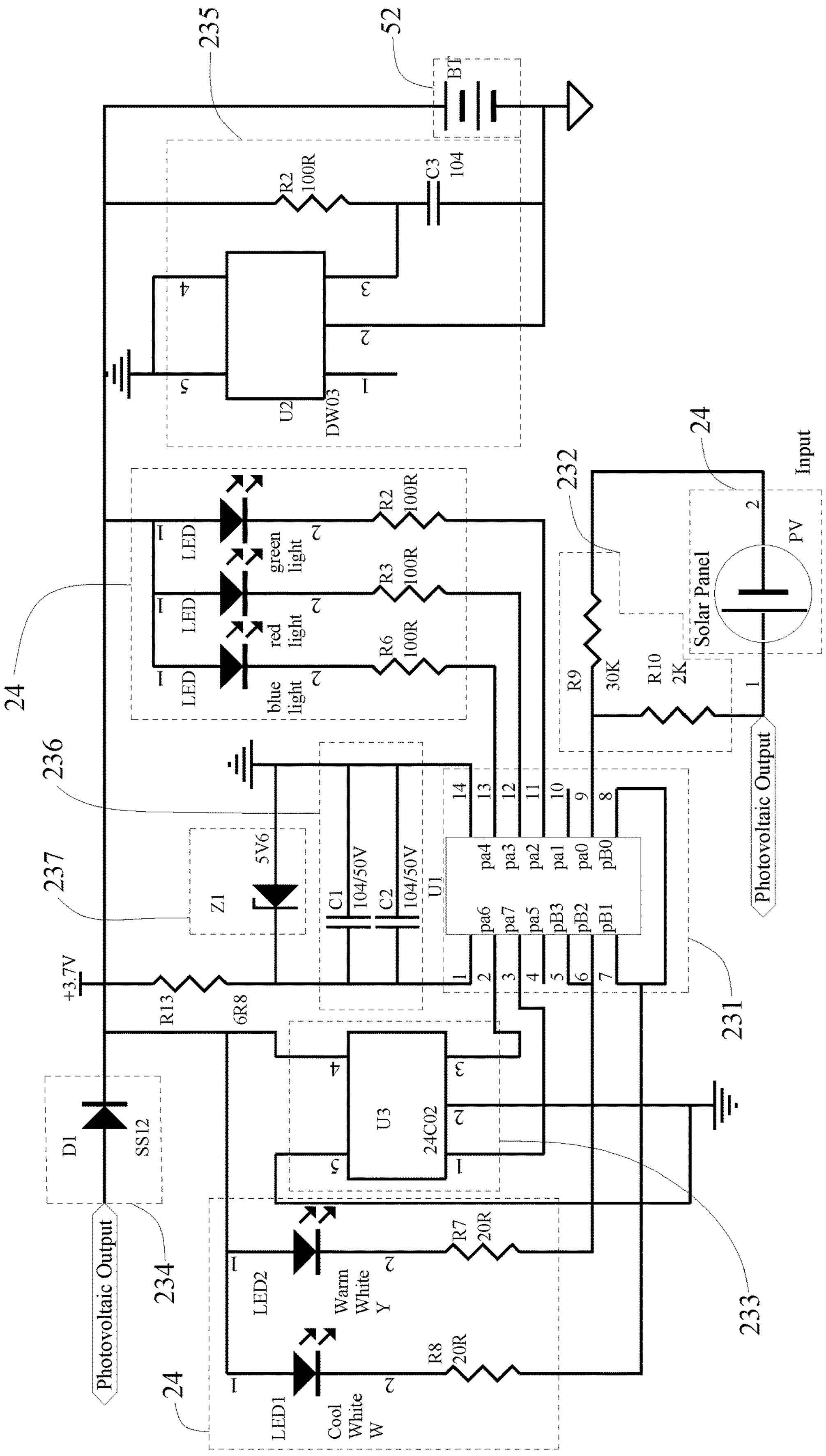
FIG. 13 is a circuit schematic diagram of the luminaire of the present disclosure.
Figure 14:
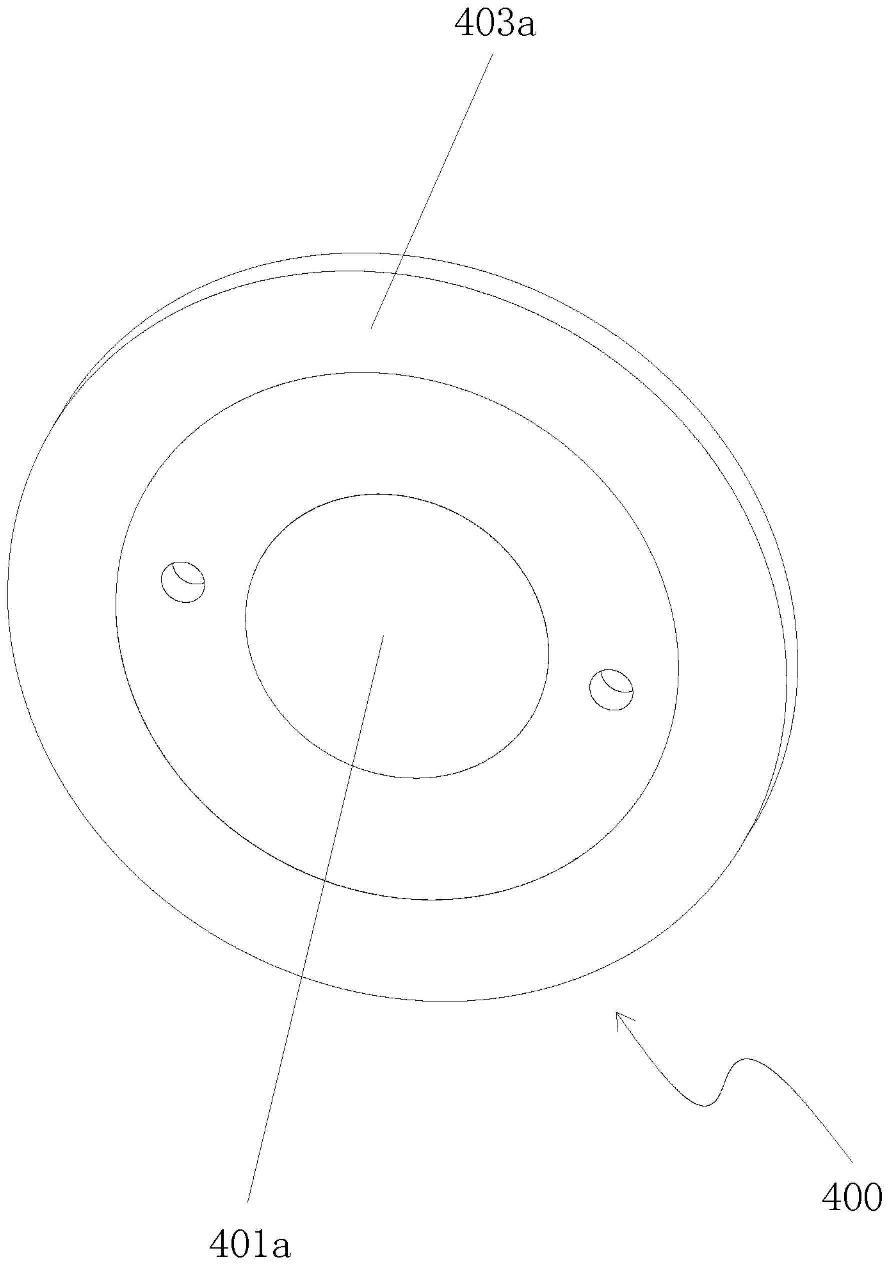
FIG. 14 is a perspective view of Embodiment 2 of the conductive plate of the luminaire of the present disclosure.

Furthermore, referring to FIG. 13 and based on the embodiment shown in FIG. 12 above, the control circuit 231 includes a control chip U1;

The storage circuit 233 includes a storage chip U3, and a bidirectional data terminal of the storage chip U3 is connected to a bidirectional data terminal of the control chip U1;

The light detection circuit 232 includes a first resistor R9 and a second resistor R10 connected in series with each other, a common node of the first resistor R9 and the second resistor R10 is connected to an input terminal of the control chip U1, a first end of the first resistor R9 is connected to a negative terminal of the solar panel 21, a second end of the second resistor R10 is connected to a positive terminal of the solar panel 21;

The delay circuit 236 includes a first capacitor C1 and a second capacitor C2, the first capacitor C1 is connected in parallel with a power input terminal of the control chip U1, the second capacitor C2 is connected in parallel with the power input terminal of the control chip U1;

The clamping circuit 237 includes a first diode Z1, and both ends of the first diode Z1 are connected in parallel with the power input terminal of the control chip U1;

The unidirectional conduction circuit 234 includes a second diode D1, and a positive electrode of the second diode D1 is connected to the positive terminal of the solar panel 21, a third resistor R13 is connected in series between a negative electrode of the second diode D1 and the power input terminal of the control chip U1, the negative electrode of the second diode D1 is connected to a positive terminal of the battery 52;

The battery management circuit 235 includes a power chip U2, a fourth resistor R2, and a third capacitor C3, a first end of the fourth resistor R2 is connected to the negative electrode of the second diode D1, the first end of the fourth resistor R2 is connected to the positive terminal of the battery 52, a second end of the fourth resistor R2 is connected to a first end of the third capacitor C3, a second end of the third capacitor C3 is grounded, a common node of the fourth resistor R2 and the third capacitor C3 is electrically connected to the power chip U2.

The control chip U1 serves as the core component of the control circuit 231, responsible for receiving the light intensity signal transmitted by the light detection circuit 232 and controlling the lighting states of the plurality of lamp beads 24 based on preset programs or user instructions. The storage chip U3 is configured to store various operational parameters and user settings of the luminaire, ensuring that the luminaire operates according to the user's expectations. Data transmission between the storage chip U3 and the control chip U1 may be performed via the $I^2C$ protocol. The voltage divider circuit composed of the first resistor R9 and the second resistor R10 may reduce the voltage generated by the solar panel 21 to a level suitable for processing by the control chip U1, thereby achieving precise detection of ambient light intensity. The first capacitor C1 and the second capacitor C2, acting as energy storage capacitors, not only filter the electrical energy output by the solar panel or the battery but also provide temporary power support to the control chip U1 during power interruptions, ensuring a smooth transition to the power-off state and preventing sudden power loss from damaging the control chip U1. The first diode Z1, as a clamping diode, may clamp the voltage at the power input terminal of the control chip U1 within a safe range, preventing damage to the control chip U1 or other circuit components due to overvoltage. The second diode D1, as a rectifier diode, allows only unidirectional flow of the direct current generated by the solar panel 21, ensuring that the electrical energy is correctly connected to the circuit while preventing reverse current from damaging the solar panel 21. The third resistor R13, as a current-limiting resistor, may limit the magnitude of current passing through the second diode D1, protecting the second diode D1 from excessive current impact. The power chip U2, as the core component of the battery management circuit 235, is responsible for monitoring the power status of the battery 52 and controlling the charging and discharging processes of the battery based on its power level, ensuring the lifespan and performance of the battery 52. The filter circuit composed of the fourth resistor R2 and the third capacitor C3 may filter the input voltage of the power chip U2, removing high-frequency noise and ripple from the voltage, thereby ensuring the stable operation of the power chip U2.

This luminaire not only features intelligent lighting control functions, allowing automatic adjustment of lighting effects based on ambient light intensity or user instructions, but also incorporates comprehensive circuit protection mechanisms to ensure stable operation under various environmental conditions, providing users with a more reliable and durable lighting experience.

Embodiment 2

Referring to FIGS. 1 to 8 and FIGS. 10 to 14, the difference between this embodiment and Embodiment 1 lies in:

The present embodiment provides a luminaire, including a translucent lamp shade 100 having an accommodating cavity 101, a light-emitting lamp assembly 200 disposed on the accommodating cavity 101, a connecting wire assembly 300 connected to a lower side of the light-emitting lamp assembly 200. The luminaire further includes:

a conductive plate 400, disposed at a lower side of the connecting wire assembly 300, and a middle part of a lower side thereof is provided with a positive conductive area 401*a* and a negative conductive area 403*a* located outside the positive conductive area 401*a;* a battery assembly 500, rotatably connected to a lower side of the translucent lamp shade 100, and a positive terminal thereof is connected to the positive conductive area 401*a*, and a negative terminal thereof is switchably connected to the negative conductive area 403*a;* the light-emitting lamp assembly 200 includes a lamp bead 24 and the printed circuit board 23, a plurality of the lamp beads 24 are provided, and the plurality of lamp beads 24 emit light of different colors after being energized;

the printed circuit board 23 is provided with a control circuit 231, a light detection circuit 232, a storage circuit 233, and a delay circuit 236;

an input terminal of the control circuit 231 is connected to an output terminal of the light detection circuit 232, a bidirectional data terminal of the control circuit 231 is connected to a bidirectional data terminal of the storage circuit 233, an output terminal of the control circuit 231 is connected to negative terminals of the plurality of lamp beads 24 respectively, to control at least one of the plurality of lamp beads 24 to emit light, a power input terminal of the control circuit 231 is connected in parallel with the delay circuit 236.

In this embodiment, the accommodating cavity 101 is a space for installing and accommodating the light-emitting lamp assembly 200 and other electronic components, and its shape and size may be designed according to actual requirements. The translucent lamp shade 100 may be made of materials with good light transmittance, such as glass or plastic, to ensure that light may be evenly emitted to the surrounding environment. The light-emitting lamp assembly 200 includes a plurality of lamp beads 24 and the printed circuit board 23, and the lamp beads 24 may emit light of different colors after being energized, providing users with rich and colorful lighting effects. The printed circuit board 23 integrates electronic components such as the control circuit 231, the light detection circuit 232, the storage circuit 233, and the delay circuit 236, realizing intelligent control of the luminaire. The control circuit 231, as the core component, is responsible for receiving the light intensity signal transmitted by the light detection circuit 232 and controlling the lighting states of the plurality of lamp beads 24 based on preset programs or user instructions. The storage circuit 233 is configured to store operational parameters of the luminaire, light effect settings, and other information, so that the control circuit 231 may read them when needed. The delay circuit 236 is configured to maintain the current light color when the power interruption time is less than 0.5 seconds.

The control circuit 231 may automatically adjust the brightness and color of the light emitted by the plurality of lamp beads 24 based on ambient light intensity or preset time conditions to provide suitable lighting effects. For example, during the day or in well-lit environments, the control circuit 231 may control the lamp beads 24 to emit light at a lower brightness or even turn off some or all of the lamp beads 24 to save energy. In contrast, at night or in dimly lit environments, the control circuit 231 may control the lamp beads 24 to emit light at a higher brightness and adjust the light color as needed to create different atmospheres. Additionally, users may send commands to the control circuit 231 through an external operation interface (such as a remote control or smartphone application) to manually adjust the lighting effects, meeting personalized lighting needs.

The conductive plate 400 is disposed at a lower side of the connecting wire assembly 300 for transmitting electrical energy provided by the battery assembly 500 to the light-emitting lamp assembly 200. The positive conductive area 401*a* and the negative conductive area 403*a* provided thereon are connected to the positive terminal and the negative terminal of the battery assembly 500 respectively, achieving the switching of the circuit. The battery assembly 500, serving as the power supply part of the luminaire, is connected to the lower side of the translucent lamp shade 100 via a rotational connection, facilitating replacement or charging by users. The positive terminal of the battery assembly 500 is connected to the positive conductive area 401*a*, while the negative terminal thereof establishes a switchable connection with the negative conductive area 403*a* through a mechanism such as a spring contact or metal plate.

Through the electrical connection structure between the battery assembly 500 and the conductive plate 400, and in synergistic action with the control circuit 231, light detection circuit 232, storage circuit 233, and delay circuit 236 integrated on the printed circuit board 23, the second embodiment of the present disclosure achieves an effect close to that described in Embodiment 1, effectively avoiding disordered color switching sequences caused by multiple brief contacts between the battery assembly 500 and the conductive plate 400. Simultaneously, during the assembly and production process, it eliminates the need to verify the precise placement position of the partitioned areas on the conductive plate 400, thereby contributing to improved production efficiency.

The above descriptions represent one implementation provided in conjunction with specific content and are not intended to limit the scope of specific implementations of the present disclosure. Any structures or methods approximating or resembling the present disclosure, or involving any quantity of technical deductions or substitutions made under the premise of the inventive concept, should be considered within the scope of protection of the present disclosure.

What is claimed is:

1. A luminaire, comprising a translucent lamp shade having an accommodating cavity, a light-emitting lamp assembly disposed on the accommodating cavity, and a connecting wire assembly connected to a lower side of the light-emitting lamp assembly, wherein the luminaire further comprises:

a conductive plate, disposed at a lower side of the connecting wire assembly, and a middle part of a lower side of the conductive plate is provided with a positive conductive area and a preload connection area located outside the positive conductive area, and a negative conductive area concentrically arranged with the preload connection area;

a battery assembly, rotatably connected to a lower side of the translucent lamp shade, and a positive terminal of the battery assembly is connected to the positive conductive area, and a negative terminal of the battery assembly is switchably connected between the preload connection area and the negative conductive area.

2. The luminaire according to claim 1, wherein a spacing area is provided between the preload connection area and the negative conductive area.

3. The luminaire according to claim 1, wherein the luminaire further comprises:

a conductive plate connector, disposed at a lower side of the translucent lamp shade and extends upward into the accommodating cavity, wherein the conductive plate connector is provided with an accommodating cavity for accommodating the conductive plate, and is further provided with a communication cavity located above the accommodating cavity and communicating with the accommodating cavity;

a locking connector, threadedly connected to an outer side of an upper end of the conductive plate connector, wherein a lower surface thereof is attached to a bottom surface of the accommodating cavity, configured to lock and connect the conductive plate connector, and the locking connector is provided with an avoidance opening communicating with the communication cavity;

a lower end of the connecting wire assembly sequentially passes through the avoidance opening and the communication cavity and then is connected to the conductive plate.

4. The luminaire according to claim 3, wherein the connecting wire assembly comprises a positive wire and a negative wire, the positive wire and the negative wire are both silver wires, or both silver-plated wires;

a left lower side wall of the communication cavity is provided with a left protrusion protruding rightward, and a right lower side wall thereof is provided with a right protrusion protruding leftward;

the left protrusion is provided with a left limiting opening for limiting a lower end of the positive wire;

the right protrusion is provided with a right limiting opening for limiting a lower end of the negative wire.

5. The luminaire according to claim 3, wherein an internal thread is provided inside the accommodating cavity;

the battery assembly comprises:

a connection housing, wherein an outer side of an upper end thereof is provided with an external thread connectable with the internal thread, and the connection housing is further provided with a placement cavity;

a battery, disposed in the placement cavity, wherein an upper positive terminal thereof is connected to the positive conductive area;

a conductive spring, disposed in the placement cavity, wherein a lower end of the conductive spring is located at a lower side of the battery, and an upper end thereof extends upward and is hooked on a side wall of an upper end of the connection housing for connection with the preload connection area or with the negative conductive area.

6. The luminaire according to claim 1, wherein the light-emitting lamp assembly comprises:

a solar panel, disposed on an upper side of the accommodating cavity;

an intermediate adjustment housing, disposed on a lower side of the solar panel, and provided with a through cavity penetrating vertically;

a printed circuit board, disposed on a lower side inside the through cavity, and connected to the solar panel and the connecting wire assembly;

a lamp bead, disposed on a lower side of the printed circuit board, configured to emit light when energized.

7. The luminaire according to claim 6, wherein a plurality of the lamp beads are provided, and the plurality of lamp beads emit light of different colors after being energized;

the printed circuit board is provided with a control circuit, a light detection circuit, a storage circuit, a unidirectional conduction circuit, a battery management circuit, a delay circuit, and a clamping circuit;

an input terminal of the control circuit is connected to an output terminal of the light detection circuit, a bidirectional data terminal of the control circuit is connected to a bidirectional data terminal of the storage circuit, an output terminal of the control circuit is connected to negative terminals of the plurality of lamp beads respectively, to control at least one of the plurality of lamp beads to emit light, a power input terminal of the control circuit is connected in parallel with the delay circuit, the power input terminal of the control circuit is connected in parallel with the clamping circuit, the power input terminal of the control circuit is connected to an output terminal of the unidirectional conduction circuit, an input terminal of the unidirectional conduction circuit is connected to an output terminal of the solar panel, the output terminal of the unidirectional conduction circuit is connected to an input terminal of the battery management circuit, an output terminal of the battery management circuit is electrically connected to the battery.

8. The luminaire according to claim 7, wherein the control circuit comprises a control chip;

the storage circuit comprises a storage chip, and a bidirectional data terminal of the storage chip is connected to a bidirectional data terminal of the control chip;

the light detection circuit comprises a first resistor and a second resistor connected in series with each other, a common node of the first resistor and the second resistor is connected to an input terminal of the control chip, a first end of the first resistor is connected to a negative terminal of the solar panel, a second end of the second resistor is connected to a positive terminal of the solar panel;

the delay circuit comprises a first capacitor and a second capacitor, the first capacitor is connected in parallel with the power input terminal of the control chip, the second capacitor is connected in parallel with the power input terminal of the control chip;

the clamping circuit comprises a first diode, and both ends of the first diode are connected in parallel with the power input terminal of the control chip;

the unidirectional conduction circuit comprises a second diode, and a positive electrode of the second diode is connected to a positive terminal of the solar panel, a third resistor is connected in series between a negative electrode of the second diode and the power input terminal of the control chip, the negative electrode of the second diode is connected to a positive terminal of the battery;

the battery management circuit comprises a power chip, a fourth resistor, and a third capacitor, a first end of the fourth resistor is connected to the negative electrode of the second diode, the first end of the fourth resistor is connected to the positive terminal of the battery, a second end of the fourth resistor is connected to a first end of the third capacitor, a second end of the third capacitor is grounded, a common node of the fourth resistor and the third capacitor is electrically connected to the power chip.

9. A luminaire, comprising a translucent lamp shade having an accommodating cavity, and a solar panel disposed on an upper side of the accommodating cavity, wherein the luminaire further comprises:

an intermediate adjustment housing, disposed on a lower side of the solar panel, and provided with a through cavity penetrating vertically;

a printed circuit board, disposed on a lower side inside the through cavity;

a lamp bead, disposed on a lower side of the printed circuit board, configured to emit light when energized;

a conductive plate connector, disposed at a lower side of the translucent lamp shade and extends upward into the accommodating cavity;

a locking connector, threadedly connected to an outer side of an upper end of the conductive plate connector, wherein a lower surface thereof is attached to a bottom surface of the accommodating cavity, configured to lock and connect the conductive plate connector;

a conductive plate, disposed inside the conductive plate connector;

a connecting wire assembly, wherein an upper end of the connecting wire assembly is connected to the printed circuit board, and a lower end thereof sequentially extends into the locking connector and the conductive plate connector and is then connected to the conductive plate;

a battery assembly, connected to a lower side of the conductive plate connector, and is connected to the conductive plate.

10. A luminaire, comprising a translucent lamp shade having an accommodating cavity, a light-emitting lamp assembly disposed on the accommodating cavity, and a connecting wire assembly connected to a lower side of the light-emitting lamp assembly, wherein the luminaire further comprises:

a conductive plate, disposed at a lower side of the connecting wire assembly, and a middle part of a lower side thereof is provided with a positive conductive area and a negative conductive area located outside the positive conductive area;

a battery assembly, rotatably connected to a lower side of the translucent lamp shade, and a positive terminal thereof is connected to the positive conductive area, and a negative terminal thereof is switchably connected to the negative conductive area;

the light-emitting lamp assembly comprises a lamp bead and the printed circuit board, a plurality of the lamp beads are provided, and the plurality of lamp beads emit light of different colors after being energized;

the printed circuit board is provided with a control circuit, a light detection circuit, a storage circuit, and a delay circuit;

an input terminal of the control circuit is connected to an output terminal of the light detection circuit, a bidirectional data terminal of the control circuit is connected to a bidirectional data terminal of the storage circuit, an output terminal of the control circuit is connected to negative terminals of the plurality of lamp beads respectively, to control at least one of the plurality of lamp beads to emit light, a power input terminal of the control circuit is connected in parallel with the delay circuit.

* * * * *